United States Patent Office.

REUBEN HAWORTH, OF SOUTH NEW MARKET, NEW HAMPSHIRE.

Letters Patent No. 68,504, dated September 3, 1867.

IMPROVED CENTRING-TOOL.

*The Schedule referred to in these Letters Patent and making part of the same.*

TO ALL WHOM IT MAY CONCERN:

Be it known that I, REUBEN HAWORTH, of South New Market, in the county of Rockingham, and State of New Hampshire, have invented a new and improved Centring-Tool; and I do hereby declare that the following is a full, clear, and exact description thereof, which will enable those skilled in the art to make and use the same, reference being had to the accompanying drawings, forming part of this specification.

This invention relates to a new and improved method of centring shafting and other articles in the process of iron-turning in machine shops; and it consists in a spindle which is attached to the lathe, which spindle holds the centring-drill in its end, and around which spindle there is a sleeve which supports a centring-cup, which sleeve and cup are crowded forward by a spiral spring, as will be hereinafter described.

The drawing represents a longitudinal central section of the tool, showing the parts of which it is composed and the manner of their combination.

Similar letters of reference indicate corresponding parts.

A represents the spindle, which is attached to the lathe by a chuck or in any other suitable manner, and which, of course, revolves with it. B is the sleeve which surrounds the spindle, and which is held to it by the action of a spiral spring and the shoulder, seen at $a$. C is the centring-cup, which is attached to the sleeve by a screw-thread, as seen at $d$. D is the centring-drill, and E is the spiral spring. The spiral spring is placed in a chamber formed by the cup C, as represented in the drawing, and the spring bears against the end of the spindle A and against the cup C with a constant pressure.

In operating with this tool, the end of the shaft or article to be centred is pressed into the cup C, which forces back the cup and sleeve on the spindle, and brings the end of the shaft or other article in contact with the drill, which, as it revolves, finds the centre of the article and drills the necessary hole at one operation. When the shaft is removed the spring throws the cup forward again for another operation. The drill is held in the end of the spindle in the usual manner, and drills of different sizes and lengths may be used in the spindle to suit different kinds of work.

C. HAYDEN.
Whiffletree.
No. 68,505.
Patented Sept. 3, 1867.
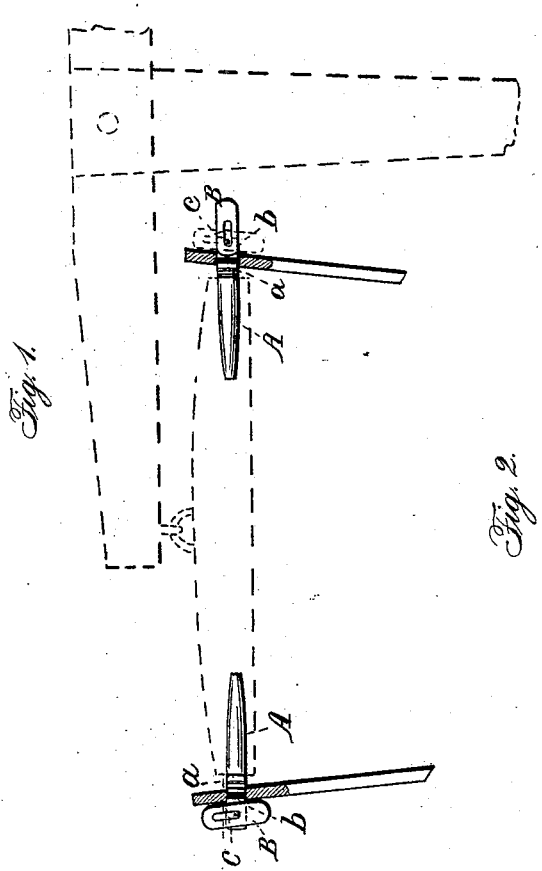

Having thus described my invention, I claim as new, and desire to secure by Letters Patent—

The spindle A, the sleeve B, the cup C, the spring E, and the drill D, constructed, arranged, combined, and operating substantially as herein shown and described, for the purposes set forth.

REUBEN HAWORTH.

Witnesses:
JOHN E. SIMPSON,
JOHN W. TOWLE